(12) United States Patent
Getta et al.

(10) Patent No.: US 10,733,096 B2
(45) Date of Patent: Aug. 4, 2020

(54) SYSTEM AND METHOD FOR FRAME BUFFER

(71) Applicant: Samsung Electronics Co., Ltd, Suwon-si (KR)

(72) Inventors: Ivan Getta, Mountain View, CA (US); Sudhi Herle, Dallas, TX (US); Ahmed M. Azab, Palo Alto, CA (US); Rohan Bhutkar, San Jose, CA (US); Guruprasad Ganesh, Santa Clara, CA (US); Wenbo Shen, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 16/107,652

(22) Filed: Aug. 21, 2018

(65) Prior Publication Data

US 2019/0155727 A1    May 23, 2019

Related U.S. Application Data

(60) Provisional application No. 62/589,794, filed on Nov. 22, 2017.

(51) Int. Cl.
| | | |
|---|---|---|
| *G06F 12/02* | (2006.01) | |
| *G06F 9/455* | (2018.01) | |
| *G06F 9/54* | (2006.01) | |

(52) U.S. Cl.
CPC ...... *G06F 12/0284* (2013.01); *G06F 9/45545* (2013.01); *G06F 9/45558* (2013.01); *G06F 9/544* (2013.01); *G06F 2009/45583* (2013.01); *G06F 2212/656* (2013.01)

(58) Field of Classification Search
CPC .... G06F 3/0634; G06F 3/0607; G06F 3/0614; G06F 3/067; G06F 3/0689; G06F 12/10; G06F 12/1081; G06F 12/08; G06F 12/0833; G06F 12/0831; H04L 67/104; H04L 67/18; H04L 29/08; H04L 67/1093; H04L 29/06
USPC ......................................................... 711/170
See application file for complete search history.

(56) References Cited

U.S. PATENT DOCUMENTS

| | | | | |
|---|---|---|---|---|
| 5,797,041 | A | * | 8/1998 | Yasue ................... G06F 13/128 709/250 |
| 7,281,213 | B2 | * | 10/2007 | Callegari .............. G06T 15/005 345/582 |
| 7,334,076 | B2 | | 2/2008 | Hendel et al. |
| 7,549,022 | B2 | | 6/2009 | Baker |

(Continued)

FOREIGN PATENT DOCUMENTS

CN    104333533 B    9/2017

*Primary Examiner* — Mano Padmanabhan
*Assistant Examiner* — Jean C Edouard (57) ABSTRACT

A method for implementing a shared memory buffer includes at an apparatus comprising a processor and a physical memory, running a host environment with a host virtual memory. The method further includes running a guest environment with a guest virtual memory, performing, by the host environment, an allocation of a frame buffer in the physical memory, and mapping the allocated frame buffer into the host virtual memory. Additionally, the method includes passing a handle of the allocated frame buffer to the guest environment and performing a mapping of the allocated frame buffer into the guest virtual memory, the mapping based on the handle of the allocated frame buffer.

20 Claims, 5 Drawing Sheets

(56) References Cited

U.S. PATENT DOCUMENTS

| | | | |
|---|---|---|---|
| 8,737,417 B2* | 5/2014 | Khawer | H04L 49/9031 |
| | | | 370/428 |
| 9,384,023 B2 | 7/2016 | Wibling et al. | |
| 9,680,954 B2 | 6/2017 | Park et al. | |
| 2006/0206562 A1* | 9/2006 | Callegari | G06T 15/005 |
| | | | 709/203 |
| 2007/0150695 A1* | 6/2007 | Kim | G06F 12/08 |
| | | | 711/203 |
| 2008/0270811 A1* | 10/2008 | Chow | G06F 1/32 |
| | | | 713/323 |
| 2011/0161482 A1* | 6/2011 | Bonola | G06F 9/5077 |
| | | | 709/223 |
| 2015/0113526 A1* | 4/2015 | Baboval | G06F 9/45533 |
| | | | 718/1 |
| 2016/0291998 A1 | 10/2016 | Dong et al. | |
| 2017/0358278 A1 | 12/2017 | Lee et al. | |
| 2019/0188148 A1* | 6/2019 | Dong | G06F 12/1009 |

\* cited by examiner

SYSTEM AND METHOD FOR FRAME BUFFER

CROSS-REFERENCE TO RELATED APPLICATION AND CLAIM OF PRIORITY

This application claims priority under 35 U.S.C. § 119(e) to U.S. Provisional Patent Application No. 62/589,794 filed on Nov. 22, 2017. The above-identified provisional patent application is hereby incorporated by reference in its entirety.

TECHNICAL FIELD

This disclosure relates generally to implementing a guest environment on a computing platform. More specifically, this disclosure relates to a system and method for a frame buffer.

BACKGROUND

The widespread adoption of smart phones, tablets and other devices for running applications has significantly increased the number and variety of computing platforms and operating systems users interact with on a regular basis. For example, an individual may, during the course of a work day, interact with applications in a first user space provided by a first operating system running on her work desktop (for example, Ubuntu), she may also interact with applications in a second user space provided by a second operating system running on her smartphone (for example, Android or iOS), and interact with applications running in a third user space provided by a third operating system (for example, Windows) running on her personal laptop.

Significant opportunities remain for enhancing the functionality of the various computing devices with which the user regularly interacts by allowing the various devices to provide guest user spaces which allow applications to run smoothly and quickly. More specifically, the technical challenges associated with presenting multiple user spaces on a single device (for example, a smart phone) include, without limitation, latency arising from passing content from a guest user space to be presented (for example, image data to be displayed on a screen, or audio data) by functionalities (for example, part of a graphics pipeline) provided by a host user space of the device.

SUMMARY

This disclosure provides a system and method for a frame buffer.

In a first embodiment, a method for implementing a shared memory buffer includes an apparatus comprising a processor and a physical memory, running a host environment with a host virtual memory. The method further includes running a guest environment with a guest virtual memory, performing, by the host environment, an allocation of a frame buffer in the physical memory, and mapping the allocated frame buffer into the host virtual memory. Additionally, the method includes passing a handle of the allocated frame buffer to the guest environment and performing a mapping of the allocated frame buffer into the guest virtual memory, the mapping based on the handle of the allocated frame buffer.

In a second embodiment, an apparatus includes a processor and a memory. The memory includes instructions, which when executed by the processor, cause the apparatus to run a host environment with a host virtual memory, run a guest environment with a guest virtual memory, and perform, by the host environment, an allocation of a frame buffer in the physical memory. Additionally, the instructions, when executed by the processor, cause the apparatus to map the allocated frame buffer into the host virtual memory, pass a handle of the allocated frame buffer to the guest environment, and perform a mapping of the allocated frame buffer into the guest virtual memory, the mapping based on the handle of the allocated frame buffer.

In a third embodiment, a non-transitory computer-readable medium includes program code, which when executed by a processor, causes an apparatus to run a host environment with a host virtual memory, run a guest environment with a guest virtual memory, and perform, by the host environment, an allocation of a frame buffer in the physical memory. The program code further causes the apparatus to map the allocated frame buffer into the host virtual memory, pass a handle of the allocated frame buffer to the guest environment, and perform a mapping of the allocated frame buffer into the guest virtual memory, the mapping based on the handle of the allocated frame buffer.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 5, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged computing system.

Figure 1:
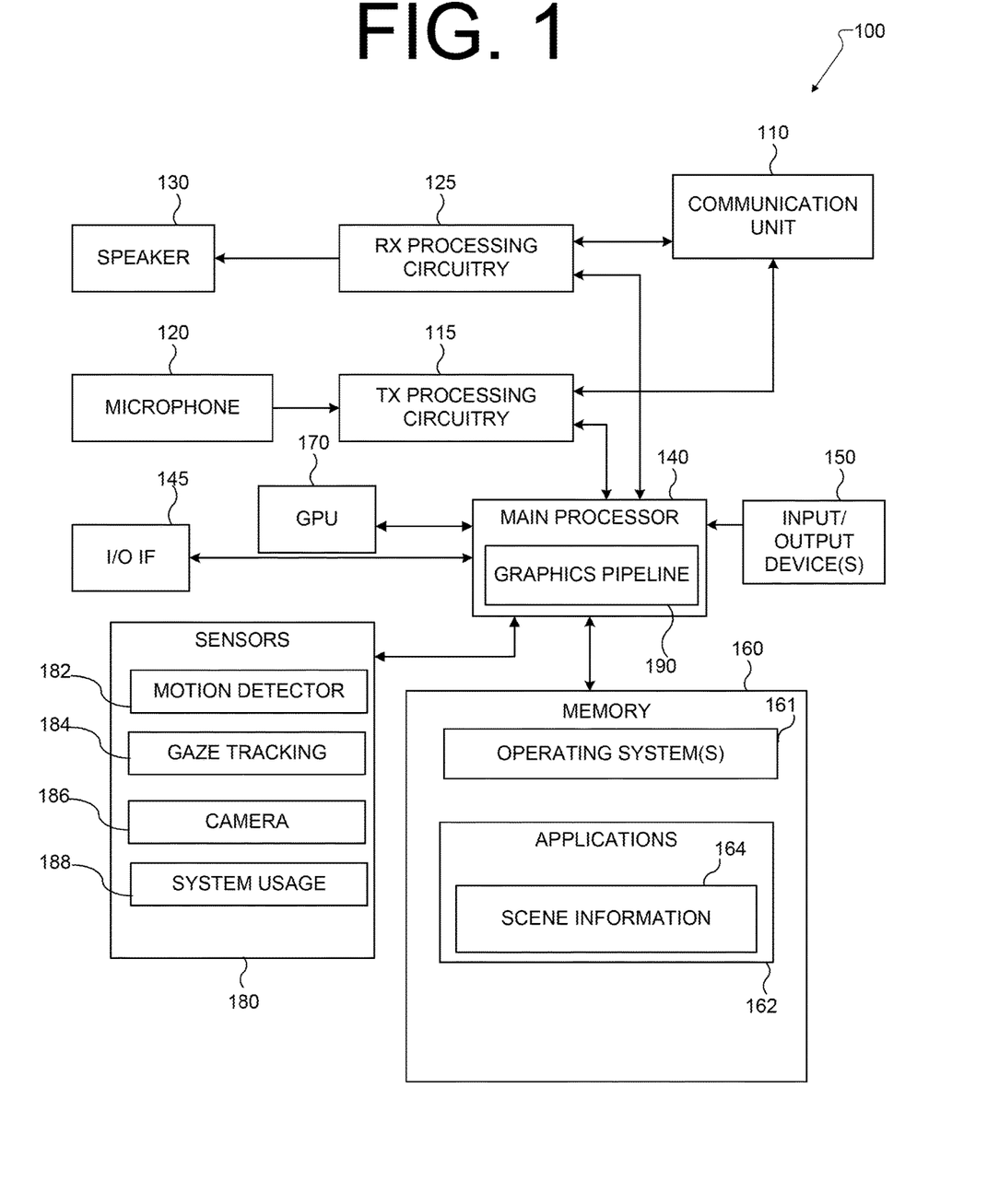
FIG. 1 illustrates an example of a device for delivering frame buffer pixels from a guest to a host environment according to certain embodiments of this disclosure.

FIG. 1 illustrates an example of a device for delivering frame buffer pixels from a guest to a host environment according to certain embodiments of this disclosure. The embodiment of device 100 illustrated in FIG. 1 is for illustration only, and other configurations are possible. However, suitable devices come in a wide variety of configurations, and FIG. 1 does not limit the scope of this disclosure to any particular implementation of a device.

As shown in FIG. 1, the device 100 includes a communication unit 110 that may include, for example, a radio frequency (RF) transceiver, a BLUETOOTH® transceiver, or a WI-FI® transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes a plurality of operating system (OS) programs 161 and one or more applications 162. According to certain embodiments, plurality of OS programs 161 includes a host, or default operating system, as well as one or more guest operating systems which can be implemented on one or more containers provided by device 100.

Applications 162 can include legacy applications, or applications developed for, and having application logic tied to host or guest operating system programs on device 100. Additionally, applications 162 can output scene information 164 for rendering and presentation on an input/output device 150, such as a screen.

The communication unit 110 may receive an incoming RF signal such as a BLUETOOTH® or WI-FI® signal. The communication unit 110 may down-convert the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data).

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, and/or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the basic OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user, sensors 180 or applications 162. Applications 162 can include applications specifically developed for the platform of device 100, or legacy applications developed for earlier platforms. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with electronic device 100. In some embodiments, input/output device(s) 150 can include a touch panel, a virtual reality headset, a (digital) pen sensor, a key, or an ultrasonic input device. Input/output device(s) 150 are, according to certain embodiments, associated with one or more of sensor(s) 180 to provide input to main processor 140.

Input/output device(s) 150 can include one or more screens, which can be a liquid crystal display, light-emitting diode (LED) display, an optical LED (OLED), an active matrix OLED (AMOLED), or other screens capable of rendering graphics. The one or more screens can include a plurality of display elements, such as electronically modulated light emitting diodes, that define a physical, or native resolution of a screen comprising input/output device(s) 150. For example, a WQHD display can have a physical resolution of 2560×1440 pixels. Additionally, screens can include a touchscreen capable of registering tactile inputs correlating with pixels of the screen and/or regions of the screen.

The main processor 140 can be configured to implement a graphics pipeline 190, including performing rendering and compositing operations according to control logic provided by basic operating system 161, applications 162 and/or other executable program code stored in memory 160.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170, and sensors 180. Main processor 140 can offload processing tasks associated with implementing graphics pipeline 190 to GPU 170. Such graphics processing tasks can include, without limitation, shading, primitive assembly and/or rasterization.

Sensors 180 can comprise a variety of sensors for generating inputs processed by device 100, and include without limitation, accelerometers, digital cameras, touch sensors, digital thermometers, pressure sensors and global positioning system sensors. For example, sensors 180 can include a motion detector 182. Motion detector 182 can be an optical sensor, an accelerometer or a gyroscopic sensor. Additionally, motion detector 182 can comprise multiple motion detectors, such as motion detectors coupled to a user's head and/or limbs. Additionally, sensors 184 may include cameras and other sensors 184 suitable for performing gaze tracking of a user's eyes, to detect which portions of the screen a user's gaze is focused upon. Sensors 180 can include additional cameras 186, including cameras disposed on the back side of screen, including sensors for providing an augmented reality (AR) experience, in which digital images are superimposed over the view of a camera positioned on or near a user's eye. Further, sensors 180 can include sensors 188 configured to monitor the usage of system resources, including, without limitation, main processor 140, GPU 170 and/or memory 160.

Although FIG. 1 illustrates one example of a device 100 delivering frame buffer pixels from a guest to a host environment according to certain embodiments of this disclosure, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
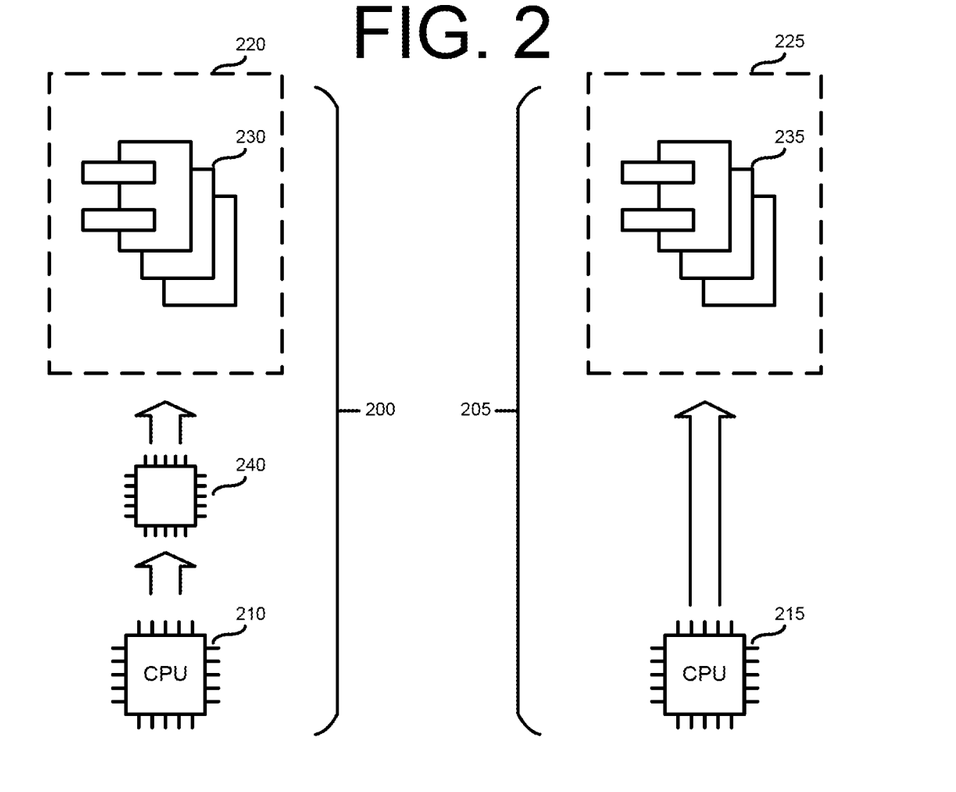
FIG. 2 illustrates aspects of containerization according to some embodiments of this disclosure.

FIG. 2 illustrates aspects of containerization according to some embodiments of this disclosure.

Referring to the non-limiting example of FIG. 2, two examples (first example 200 and second example 205) of mechanisms for providing a guest user space (for example, a Linux-based user space on an Android device) are depicted.

Example 200 illustrates a method of implementing a guest user space on a device using a virtual execution environment 220 on a device. In this particular example, applications 230 are applications designed to run in a user space provided by a first operating system. Processor 210 is a hardware CPU of a computing device, the computing device running a second operating system whose kernel handles, for example, allocation of the device's memory, and access to one or more input/output devices of the device, such as the display, touch screen and speakers. In this example, virtual execution environment (VEE) 220 provides a guest user space, in which applications designed for the first operating system can be executed. VEE 220 provides a functional emulation, or simulation of a device running the first operating system. For VEE 220 to provide an effective emulation of a device running the first operating system, the processor 210 runs one or more virtualization programs to provide a virtual machine (or virtual processor) 240.

In example 200, applications 230 are, in effect, executed twice, first by virtual machine 240, and also by processor 210. The two-layered execution associated with providing a guest user space through a VEE significantly increases the processing load and latency associated with running applications in a VEE-based guest user space, particularly when the application provides of device resources (for example, the display or audio processing hardware) assigned to namespaces of the host user space's kernel. Simply put, virtual machine 240 creates a significant bottleneck in the flow of data into and out of VEE 220.

Buffering pixels rendered to be passed from a guest user space to be presented by a display controlled by a process (for example, part of all of a graphics pipeline) of the host user space's OS kernel is but one example of the inefficiency and latency associated with using a VEE to implement a guest user space. In some cases, to be presented on the device display, pixels rendered in the guest user space are passed to the host user space through a socket implemented on a client/server approach. To be passed through the socket to the host user space, the pixels must be packed and sent over the socket after every frame buffer update. Subsequently, one or more processes of the host user space receive, unpack and composite the pixels after each frame update. Additionally, in cases where the socket is implemented as a network socket, the additional steps of routing, packet filtering and checksum calculations for each packet passed through the socket are required. Simply put, the passage of frame buffer pixels from a guest user space to a host user space introduces significant extra computational overhead and latency. Further, in some cases, the pixels may be compressed as part of the packing process, resulting in degradation of image quality.

Example 205 illustrates aspects of implementing a guest user space using kernel sharing or containerization according to various embodiments of this disclosure. In non-limiting example 205, a guest user environment is provided through container 225. In contrast to example 200, in example 205, applications 235 in container 225 are not executed by a virtual machine or emulated processor (for example, virtual machine 240), but rather as software of the host user space executed by hardware CPU 215 of the device. According to certain embodiments, applications 235 work directly with hardware registers of the device directly (just as if they were operating in a host user space of the device). For example, applications 235 may be able to write directly to regions of the physical memory of the device specifically assigned to the container by the host user space.

By eliminating the processing bottleneck associated with implementing an emulation of a processor (such as virtual machine 240), as well as the additional copying and processing required to pass rendered pixels through a socket, certain embodiments according to this disclosure provide a zero-copy solution to passing pixels from the guest user space to the host user space. Further, certain have been shown to provide significant improvements in the performance of applications requiring frequent screen updates (for example, streaming video and video playback) executing in a guest user space. Table 1 below shows performance metrics of a comparison test between instances of applications running in a VEE versus instances of the same application running in a container according to certain embodiments of this disclosure.

TABLE 1

| Operation | Performance by Application in VEE | Performance by Application in Container |
| --- | --- | --- |
| Compiling Files | Time to Compile: 6 m, 34 s | Time to Compile: 6 m, 17 s |
| Video playback on Canvas | Average Running FPS: 3.43 FPS | Average Running FPS: 7.48 FPS |
| Playback of YOUTUBE ® Video | Total Frames Rendered: 3141 (at 1080 p/60 FPS setting) | Total Frames Rendered: 5410 (at 1080 p/60 FPS setting) |

Figure 3:
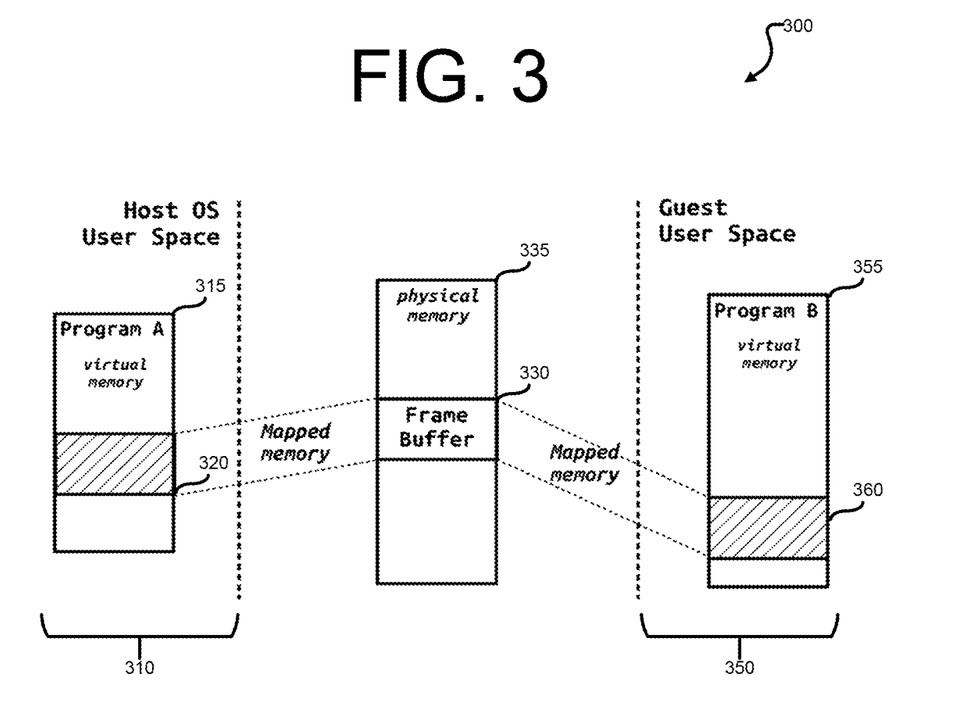
FIG. 3 illustrates an example of delivering frame buffer pixels from a guest environment to a host environment according to various embodiments of this disclosure.

FIG. 3 illustrates an example 300 of delivering frame buffer pixels from a guest environment to a host environment according to various embodiments of this disclosure.

Referring to the non-limiting example of FIG. 3, a device operating a host OS implements a host user space 310, and a container providing guest user space 350. According to certain embodiments, host user space 310 and guest user space 350 are based on different OS (for example, host user space 310 is running the Android OS, while guest user space 350 is running WINDOWS®). In some embodiments, host user space 310 and guest user space 350 may be based on the same OS, with the two user spaces providing isolated or "jailed" instances of the operating system.

According to certain embodiments, programs running in host user space 310 include one or more programs 315 responsible for implementing a shared frame buffer 330 in the physical memory 335 of the device. In some embodiments, programs running in guest user space 350 include one or more programs 355 which pass pixels rendered within guest user space 350 to host user space 310 for display on a screen controlled by processes of host user space 310. Programs 355 include, without limitation, games, video playback applications, or other applications which have content to be displayed on the device.

As shown by the non-limiting example of FIG. 3, program 315 in host user space 310 allocates a portion of physical memory 335 as a frame buffer 330. As a program in the host user space and implementing the host OS of the device, program 315 may be better positioned to ensure that the frame buffer 330 is allocated in a way that is fully compliant with, for example, the display controller and graphics acceleration hardware of the underlying device. As an application operating in the host user space, program 315 is, in certain embodiments, able to access information regarding details of physical memory 335 (for example, start address alignment, stride of an array, and whether an array is contiguous in physical memory), which are not available to applications running in guest user space 350. This information can be useful for allocating frame buffer 330 in a way that attempts to optimize the performance of frame buffer 330.

According to certain embodiments, after allocating a portion of physical memory 335 as a frame buffer, program 315 maps the allocated frame buffer into its virtual address space, thereby allowing program 315 to access rendered pixels in frame buffer 330 without a memory copy.

In some embodiments, program 315 passes a handle to the allocated frame buffer 330 to program 355 running in guest user space 350. According to some embodiments, a handle may be provided in the form of a file descriptor. In the non-limiting example of FIG. 3, program 355 uses the handle (or address information provided with the handle) to map the frame buffer into its own virtual address space. With the virtual address space of both program 315 and program 355 both mapping to the same region of physical memory 335 used as frame buffer 330, rendered pixels are immediately available to processes in the host user space 310. In some embodiments, program 355 reports to program 315 each time the frame buffer is updated. Additionally, according to certain embodiments, program 315 includes one or more APIs for passing pixels obtained from the frame buffer to one or more processes controlling the device display (for example, SurfaceFlinger in Android, or Quartz Compositor in iOS).

Figure 4:
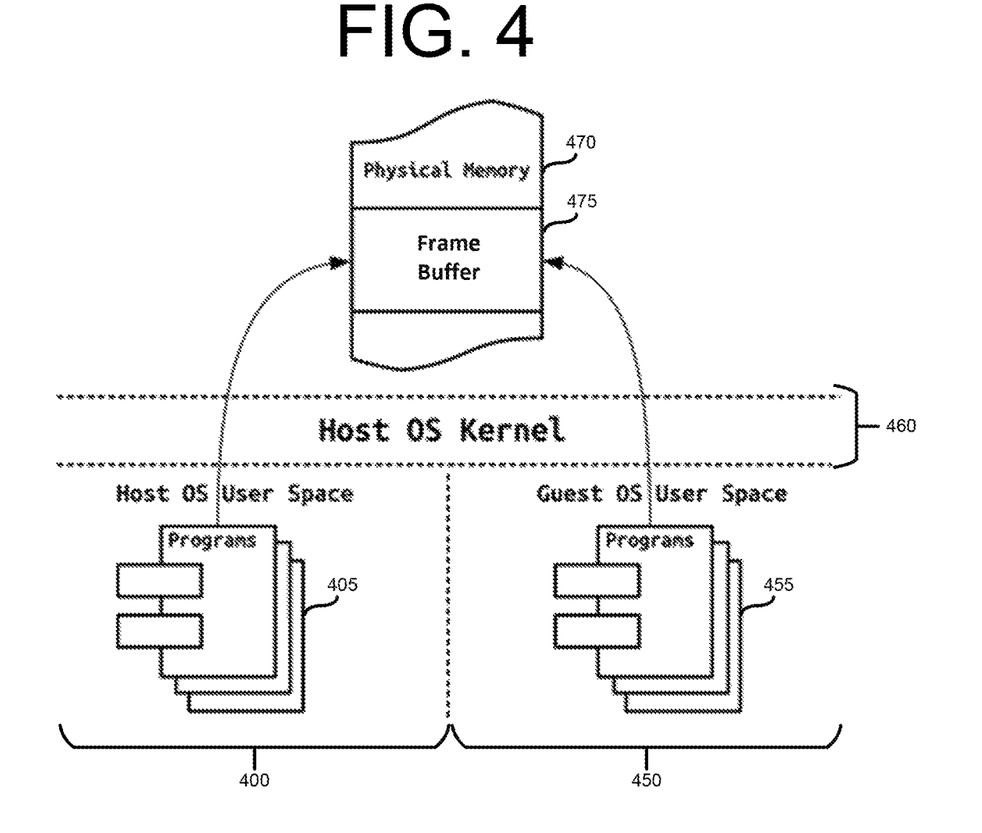
FIG. 4 illustrates an example of kernel sharing according to at least one embodiment of this disclosure.

FIG. 4 illustrates an example of kernel sharing as implemented in various embodiments according to this disclosure.

As discussed with reference to FIG. 2, certain embodiments according to this disclosure provide a zero-copy alternative to passing rendered pixels through a socket from a guest user environment operating in a virtual execution environment. As used in this disclosure, the term container encompasses one or more features of an operating system kernel (for example, the "namespaces" provided by the Linux kernel) which enable multiple isolated user space instances to have partitioned access to the resources of the device running the operating system.

Referring to the non-limiting example of FIG. 4, on a device running a host operating system (OS), the host OS kernel 460 connects applications running on the device to the hardware on the device, including, without limitation, physical memory 470 and the device display (not shown). According to certain embodiments, at least two user spaces are running on the system, and have partitioned access to device resources. In this illustrative example, a first user space 400 is provided for applications 405 to be run in the execution environment of the host OS. According to certain embodiments, a second user space 450 is provided for programs 455 to be run in a separate execution environment. In some embodiments, second user space 450 is a container provided by host OS kernel 460.

As indicated by the vertical dotted line between first user space 400 and second user space 450, applications in the two user spaces are logically isolated from one another. According to some embodiments, programs 455 include an operating system which is different than the host OS of the device.

As shown by the dashed horizontal lines between first user space 400, second user space 450 and physical memory 470, while first user space 400 and second user space 450 are logically isolated from one another, both user spaces access device resources through host OS kernel 460. In this regard, first user space 400 and second user space 450 "share" host OS kernel 460 for, amongst many things, the purposes of accessing physical memory 470. According to certain embodiments, the device changes the root file system(s) of processes in second user space 450 from the root file system(s) of processes in first user space 400. As such processes in both first user space 400 and second user space 450 use the same OS kernel to execute processes and access system resources (e.g., processes are executed at native speeds, rather than at the reduced processing speeds associated with implementation of a VM). However, from the perspective of first user space 400 and second user space 450, each of these user spaces "believes" that it is a separate machine with its own root file system. Such kernel sharing permits a single section of physical memory 470 to be mapped to virtual address spaces in both first user space 400 and second user space 450 as frame buffer 475. Frame buffer 475 can be used, without limitation, as a frame buffer for passing pixels from second user space 450 to first user space 400, or as a shared memory resource for efficient and secure exposure of the device's hardware resources (for example, audio hardware, cameras, graphics acceleration hardware, etc.) to programs 455 in second user space 450.

Figure 5:
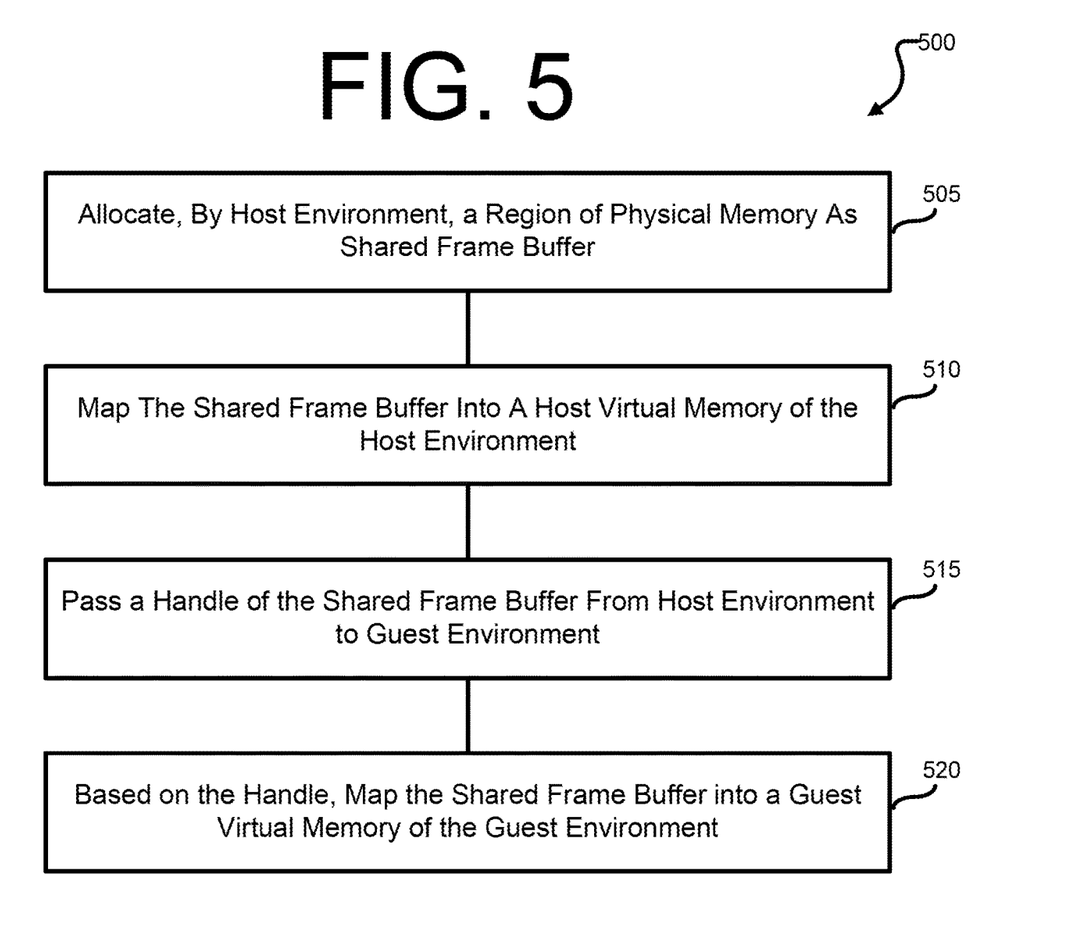
FIG. 5 illustrates operations of a method for delivering frame buffer pixels from a guest to a host environment according to some embodiments of this disclosure.

FIG. 5 illustrates operations of a method 500 for delivering frame buffer pixels from a guest to a host environment according to some embodiments of this disclosure.

Referring to the non-limiting example of FIG. 5, method 500 may be performed at any suitable apparatus (for example, electronic device 100 in FIG. 1) with a processor and a physical memory.

In certain embodiments, method 500 includes operation 505, wherein the host environment allocates a region of the physical memory as a shared frame buffer. As discussed elsewhere in this disclosure, the host environment may have access to system information necessary to ensure that the allocation of the memory for the frame buffer is, for example, fully compliant with the underlying display controller and graphics acceleration hardware of the device. According to certain embodiments, as part of operation 505, the host environment secures the shared frame buffer, thereby providing a safeguard against issues arising if software within the guest environment is compromised. Securing the shared frame buffer, can be performed using a number of techniques, including, without limitation, performing a memfd_create( ) system call, or applying seals to the file descriptor of the shared frame buffer using a fcntl( ) system call.

According to various embodiments, at operation 510, the host environment (or an application operating in the host environment) maps the allocated frame buffer into its virtual address space, thereby allowing the host application direct access to pixels in the frame buffer without having to perform a memory copy. As shown in the non-limiting example of FIG. 5, at operation 515, the host environment passes a handle of the shared frame buffer to the guest environment. As shown in the non-limiting example of FIG. 5, at operation 520, the shared frame buffer is mapped into a virtual address space of the guest environment. While not shown in the non-limiting example of FIG. 5, the connection to the shared frame buffer established in operations 505 through 520 can, in some embodiments, be disengaged by either the host or guest environment. In the event of either the host or guest environment initiating a disengagement, the kernel may ensure that the shared memory segment providing the shared frame buffer remains valid until it is referenced by at least one handle on either the host or guest side.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for implementing a shared memory buffer, the method comprising:
    at an apparatus comprising a processor and a physical memory, running a host environment with a host virtual memory;
    running a guest environment with a guest virtual memory;
    performing, by the host environment, an allocation of a frame buffer in the physical memory;
    mapping the allocated frame buffer into the host virtual memory;
    passing a handle of the allocated frame buffer to the guest environment; and
    performing a mapping of the allocated frame buffer into the guest virtual memory, the mapping based on the handle of the allocated frame buffer,
    wherein the guest environment is in a first container, and the first container shares part of a kernel with the host environment.

2. The method of claim 1, wherein the guest environment provides a second instance of an operating system provided in the host environment.

3. The method of claim 1, wherein the allocation of the frame buffer by the host environment is compliant with at least one of a display controller or graphics acceleration hardware of the apparatus.

4. The method of claim 1, further comprising:
    serving an application on the guest environment; and
    reporting, from the guest environment to the host environment, whenever the frame buffer is updated.

5. The method of claim 4, further comprising displaying, on a screen, contents of the updated frame buffer.

6. The method of claim 1, wherein the host environment performs the allocation of the frame buffer in the physical memory based on information regarding the physical memory that is inaccessible from the guest environment.

7. The method of claim 1, further comprising securing, by the host environment, the allocated frame buffer.

8. An apparatus, comprising:
    a processor; and
    a physical memory coupled to the processor, containing instructions, which when executed by the processor, cause the apparatus to:
    run a host environment with a host virtual memory,
    run a guest environment with a guest virtual memory,
    perform, by the host environment, an allocation of a frame buffer in the physical memory,
    map the allocated frame buffer into the host virtual memory,
    pass a handle of the allocated frame buffer to the guest environment, and
    perform a mapping of the allocated frame buffer into the guest virtual memory, the mapping based on the handle of the allocated frame buffer,
    wherein the guest environment is in a first container, and the first container shares part of a kernel with the host environment.

9. The apparatus of claim 8, wherein the guest environment provides a second instance of an operating system provided in the host environment.

10. The apparatus of claim 8, wherein the allocation of the frame buffer by the host environment is compliant with at least one of a display controller or graphics acceleration hardware of the apparatus.

11. The apparatus of claim 8, wherein the memory contains instructions, which when executed by the processor, cause the apparatus to:

serve an application on the guest environment; and report, from the guest environment to the host environment, whenever the frame buffer is updated.

12. The apparatus of claim 11, wherein the memory contains instructions, which when executed by the processor, causes the apparatus to display on a screen, contents of the updated frame buffer.

13. The apparatus of claim 8, wherein the host environment performs the allocation of the frame buffer in the physical memory based on information regarding the physical memory that is inaccessible from the guest environment.

14. The apparatus of claim 8, wherein the memory contains instructions, which when executed by the processor, cause the apparatus to secure, by the host environment, the allocated frame buffer.

15. A non-transitory computer-readable medium comprising program code, which when executed by a processor, causes an apparatus to:

run a host environment with a host virtual memory, run a guest environment with a guest virtual memory, perform, by the host environment, an allocation of a frame buffer in a physical memory, map the allocated frame buffer into the host virtual memory, pass a handle of the allocated frame buffer to the guest environment, and perform a mapping of the allocated frame buffer into the guest virtual memory, the mapping based on the handle of the allocated frame buffer, wherein the guest environment is in a first container, and the first container shares part of a kernel with the host environment.

16. The non-transitory computer-readable medium of claim 15, wherein the guest environment provides a second instance of an operating system provided in the host environment.

17. The non-transitory computer-readable medium of claim 15, comprising program code, which when executed by the processor, causes the apparatus to:

serve an application on the guest environment; and report, from the guest environment to the host environment, whenever the frame buffer is updated.

18. The non-transitory computer-readable medium of claim 17, comprising program code, which when executed by the processor, causes the apparatus to display on a screen, contents of the updated frame buffer.

19. The non-transitory computer-readable medium of claim 15, wherein the host environment performs the allocation of the frame buffer in the physical memory based on information regarding the physical memory that is inaccessible from the guest environment.

20. The non-transitory computer-readable medium of claim 15, further comprising program code, which when executed by the processor, causes the apparatus to secure, by the host environment, the allocated frame buffer.

* * * * *